United States Patent [19]

Symann

[11] 3,935,716

[45] Feb. 3, 1976

[54] SHAFT COUPLING

[75] Inventor: Heinz-Georg Symann, Dortmund-Brackel, Germany

[73] Assignee: Kupplungstechnik GmbH, Rheine, Germany

[22] Filed: June 28, 1974

[21] Appl. No.: 484,337

Related U.S. Application Data

[62] Division of Ser. No. 252,226, May 11, 1972, abandoned.

[52] U.S. Cl. .............. 64/13; 64/11 R; 64/27 NM
[51] Int. Cl.² .......................................... F16D 3/78
[58] Field of Search........ 64/11, 12, 13, 27 NM, 14, 64/6

[56] References Cited
UNITED STATES PATENTS

| | | |
|---|---|---|
| 1,777,895 | 10/1930 | Roderick .............................. 64/12 |
| 2,207,496 | 7/1940 | Anderson, Jr...................... 64/11 R |
| 2,753,702 | 7/1956 | Dunn ...................................... 64/13 |
| 2,883,839 | 4/1959 | Troeger et al. ......................... 64/13 |
| 3,481,158 | 12/1969 | Mayerjak .............................. 64/12 |
| 3,630,049 | 12/1971 | Feller ...................................... 64/13 |
| 3,724,239 | 4/1973 | Calistrat .............................. 64/11 R |

*Primary Examiner*—Samuel Scott
*Assistant Examiner*—Randall Heald
*Attorney, Agent, or Firm*—Gifford, Chandler & Sheridan

[57] ABSTRACT

In a shaft coupling having a flexible coupling member between the two coupling halves the coupling member comprises a plurality of circular members each having a pair of projections on each side extending axially and being offset with respect to one another for power transmission between the coupling halves.

5 Claims, 20 Drawing Figures

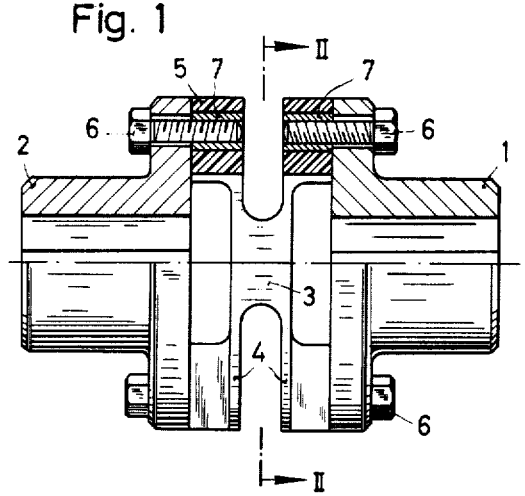
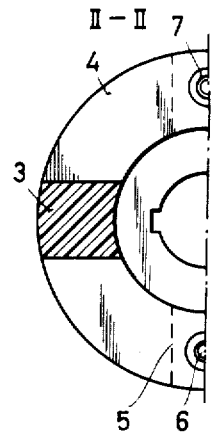
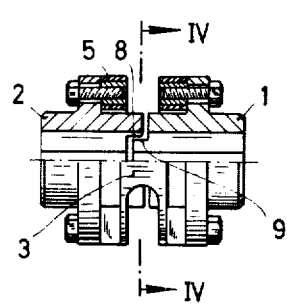
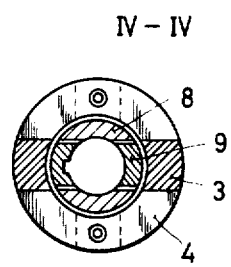
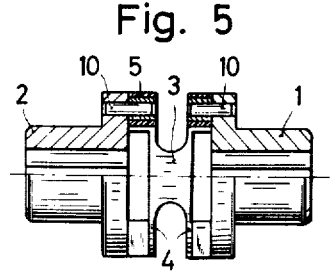
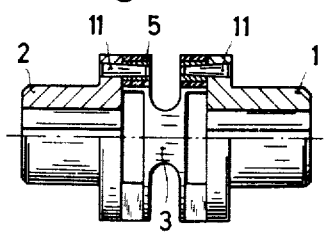

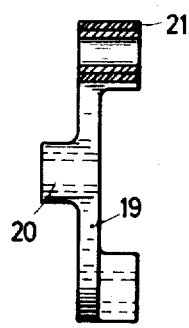
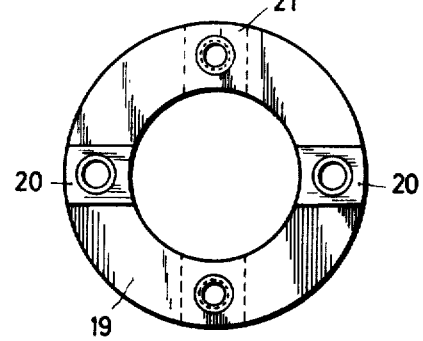
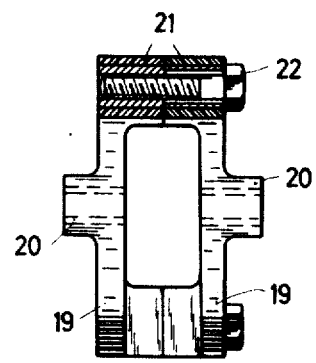
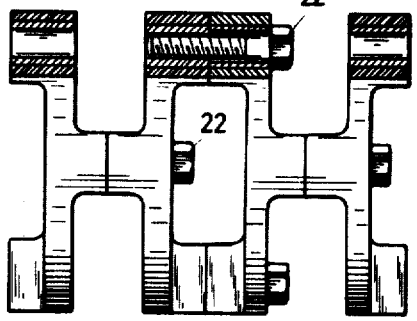

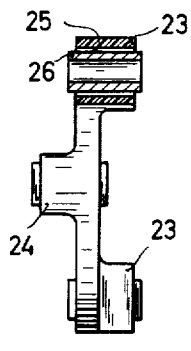
Fig. 13
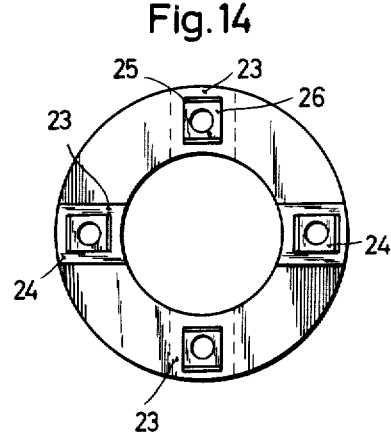
Fig. 14
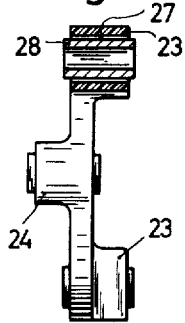
Fig. 15
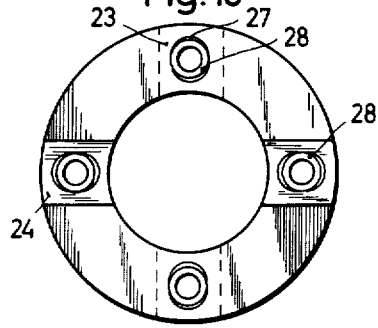
Fig. 16
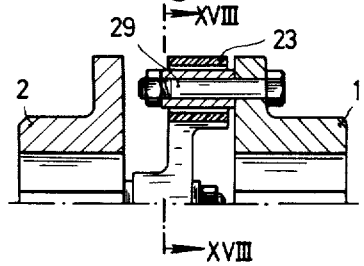
Fig. 17
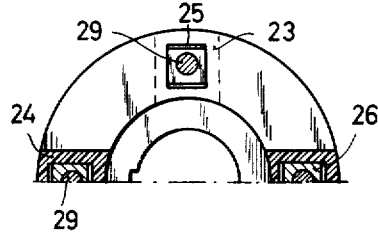
Fig. 18 XVIII-XVIII

XX-XX

SHAFT COUPLING

This application is a division of Ser. No. 252,226, filed May 11, 1972 and now abandoned.

BACKGROUND OF THE INVENTION

1. Field of the Invention

The present invention relates generally to shaft couplings and, more particularly, to flexible shaft couplings.

2. Description of the Prior Art

In known shaft couplings the flexible coupling member disposed between both coupling halves is made of steel membranes formed in a similar manner as cup springs and are held peripherally in a central bore by the driving and/or power take-off side. Aside from membrane couplings of this type there are also known shaft couplings provided with leaf springs of various forms, which are mounted in a peripheral direction and connected alternatingly to the driving or power take-off side. These prior art shaft couplings are made of metal only, i.e. particularly steel, and are costly to manufacture. They accommodate only angular or axial displacements, and do not provide for radial displacement of the shafts coupled one to another; likewise they do not afford electrical isolation of both shafts with respect to one another, which is very often a desirable factor with different drive means.

SUMMARY OF THE PRESENT INVENTION

It is an object of the invention to provide a shaft coupling of simple and inexpensive construction capable of torque transmission free from play or backlash when displacing the mutually coupled shafts in radial as well as angular and axial direction. Also, it is intended that the coupling may be utilized at varying axial spacial relationships of the shafts as well as being capable of being mounted and removed in radial direction, permitting isolation of both shafts with respect to one another.

In accordance with the invention the coupling member mounted between both coupling halves comprises several projections or studs offset peripherally with respect to one another and being alternatingly connected for load transmission to the one or the other coupling half, said stud being joined by at least one annular lamination or disk. The coupling member is preferably constructed of an integral body made of synthetic material, which body could be formed to its final shape by means of the injection moulding or casting method, without requiring any finishing or secondary treatment.

It is suitable to arrange the studs or stays of the coupling elements — being alternatingly connected to the one or the other of the coupling halves — parallel to the coupling axis so as to hold the disks at a distance from the face or fronts of the coupling halves such that they can bend or sag to allow the coupling to assume an angular position. Due to the bending stress or several laminations or disks the coupling is in a position to transmit, without backlash, the torque from the one coupling half to the other coupling half even when large radial, angular or axial displacements of both shafts occur.

In order to assure that the coupling is maintained operable in case of emergency — desirable when used with hoisting or lifting means — and to prevent breakage of the flexible coupling member on account of overload, in a further development of the invention it is provided that the hubs of the coupling halves interconnected by means of the coupling member enter into claw-like engagement with each other.

Assembly of both coupling halves can be facilitated if, in accordance with yet another object of the invention, the studs with their associated coupling halves are connected with bolts being in parallel relationship with respect to their axis. These bolts may be cylindrical pins, thus permitting the coupling halves to be telescoped in axial direction with one another. It is also possible to interconnect the coupling halves to the studs of the coupling member by means of screws which can be loosened to permit removal of the coupling member in the axial direction. Telescoping both coupling halves in the axial direction can be facilitated by the use of conically shaped pins.

The coupling member can comprise a plurality of annular laminations or disks arranged in axial relationship adjacent to one another, permitting the axial distance of both coupling halves to be augmented and the flexibility to be increased.

The coupling member may also be constructed in the form of a bushing or sleeve at the end of which the disks supporting studs are mounted. In the case that the coupling member comprises only one disk, the studs connected to both coupling halves are arranged in groups on different sides of the disk. It is also possible to mount several disks of this type in a line and to assemble them by means of screws, pins, rivets or even with adhesive to form an integral coupling member.

When using only one lamination or disk — provided with respectively two studs offset at an angle of 180° at the driving and power take-off side of the coupling — it is possible to provide recesses on the studs wherein angular formed parts could be inserted, which parts are movable in said recesses to a position flush with respect to the periphery. Connecting both coupling halves to these angular formed parts a radial movability offset by about 180° is obtained for the driving and power take-off flange.

Similarly, instead of providing rectangular recesses it is also possible to form oblong holes in the studs of the coupling disks, in which holes cylindrical bodies are movably housed so as to roll off in said coupling disks, thus diminishing detrimental wear and tear.

The invention is not limited to this embodiment alone but only to the frame and scope as delimited by the appended claims which reveal additional modifications of the invention.

BRIEF DESCRIPTION OF THE DRAWINGS

In the drawings:

FIG. 1 is a longitudinal section of a shaft coupling having an integral coupling member comprising two laminations or disks, FIG. 2 is a section along the line II—II of FIG. 1, FIG. 3 is a longitudinal section of a shaft coupling with claw-type engaging hubs of both coupling halves, FIG. 4 is a section taken at IV—IV of FIG. 3, FIG. 5 is a longitudinal section of a shaft coupling with studs of the coupling member being attached by means of cylindrical pins to both coupling halves, FIG. 6 is a section of a shaft coupling having conically shaped pins for attaching said studs, FIG. 9 is a partially sectional side view of a coupling element consisting of a single annular disk, FIG. 10 is a front view of FIG. 9, FIG. 11 is a partially sectional side view of a coupling member composed of two serried disks of FIG. 9, FIG. 12 is a coupling member consisting of a plurality of disks of FIG. 9, which disks are interconnected by means of screws, FIG. 13 is a side view, partially in section, of a coupling member having but a single disk and two studs in offset relationship with respect to one another at the driving and power take-off side, which studs are provided with rectangular recesses, FIG. 14 is a front view of FIG. 13, FIG. 15 is a partially sectional view of a coupling disk provided with oblong holes sunk in said studs, FIG. 16 is a front view of FIG. 15, FIG. 17 is a longitudinal section of a disk according to FIG. 3 mounted into said clutch coupling, FIG. 18 is a sectional view taken at XVIII—XVIII of FIG. 17.

DETAILED DESCRIPTION

Figure 7:
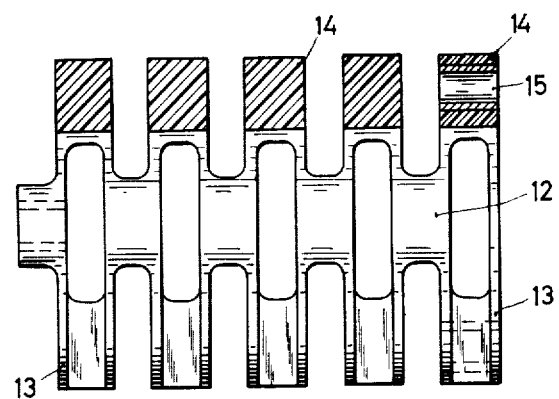
FIG. 7 is a partially sectional view of a coupling member having several disks.

In the embodiment presented in FIGS. 1 and 2 the shaft coupling comprises two coupling halves 1 and 2 mounted torsionally resistant at the ends of the interconnecting shafts (not shown). Between the coupling halves 1 and 2 a coupling member 3 is located which consists of two annular laminations or disks 4 united so as to form one integral body made of plastic. Said disks 4 are provided at their periphery with axially parallel studs or projections 5 located at diametrically opposite ends thereof. The studs are alternatingly offset or staggered in the direction of the periphery by means of screw bolts 6, engaging screw sockets 7 of studs 5 and attached to the flanges of the associated coupling halves 1 and 2. Studs 5 do not only transmit torque from one coupling half to the other but maintain disks 4 at such a distance from the ends of the coupling halves 1 and 2 that the disks 4 will bend or sag when the shaft is being displaced or shifted. After loosening screw bolts 6 the coupling member 3 may be removed in radial direction.

While the embodiment according to FIGS. 1 and 2 shows both coupling halves 1 and 2 with even ends or frontal areas, said ends are provided in the embodiment according to FIGS. 3 and 4 with lugs 8 and 9 which engage one another in a claw-type manner to assure that the shaft coupling is operable in case of emergency when the coupling member 3 might break due to overload. This embodiment is recommended particularly for hoisting or lifting mechanisms due to its mechanical disruptive strength.

In the embodiment illustrated in FIG. 5 the screw bolts 6 of the first embodiment have been replaced on both coupling halves 1 and 2 by pins 10 for attaching the coupling member 3; thus, both halves 1 and 2 may be displaced in an axial direction towards coupling member 3, thereby facilitating assembly of the clutch.

The embodiment presented in FIG. 6 is provided with conical pins 11 for attaching the studs 5 to the coupling halves 1 and 2; said pins do, likewise, facilitate the axial telescoping operation of both coupling halves.

An increase of the axial spacing of the shafts coupled one to another of the flexibility of the coupling can be achieved according to FIG. 7 by providing a greater number of disks. In this way, the coupling member 12 arranged between both coupling halves comprises ten annular disks 13 lying in parallel radial planes, each pair of which disks being provided with a stud or stay 14. The outermost of these studs 14 associated with the ends or frontal areas of the coupling halves are provided with recesses for receiving fixing elements.

Figure 8:
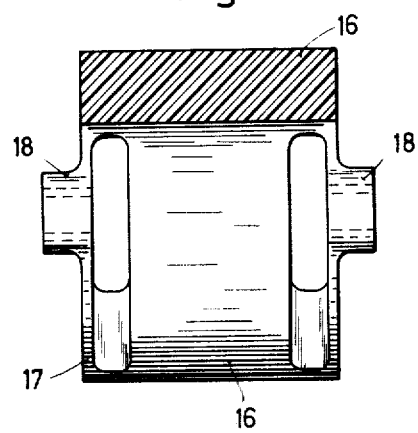
FIG. 8 is a partially sectional view of a bush-type coupling member.

FIG. 8 shows an integral coupling member 16 having a center portion formed as a bushing. This coupling member is equipped only at its ends with one or several disks 17 for receiving the studs 18 mounted on the coupling halves.

Likewise, the coupling member interconnecting both coupling halves may be so designed as to comprise only a single disk 19, as illustrated in FIGS. 9 and 10. This disk is provided on the driving side with two studs 20 situated diametrically opposite each other and on the power take-off side, likewise, with studs 21 set off with respect to the former. These studs 21 are designed for attachment to the flanges of both coupling halves and safeguarding the spacing of disk 19 from both of their ends.

It is also possible to arrange two or more of such disks in a row, as shown in FIG. 11, interconnecting the adjacent studs 21 by means of screw bolts 22 or by pins, rivets or adhesive.

Referring now to FIG. 12 where a row of four of such disks is shown to form a cohesive coupling element the individual disks of which are, likewise, joined together by means of screw bolts 22 or pins, rivets or adhesive.

When used in accordance with FIGS. 13 and 14 only one disk each having two studs offset by 180° for coupling half 1 and studs 24 for coupling half 2 there are provided in studs 23, 24 rectangular recesses 25 into which rectangular formed parts 26 are inserted for receiving the mounting or fixing elements. The formed parts 26 are disposed such as to be displaceable in radial direction, however, with no backlash in peripheral direction at the radial walls of the recesses 25, thus assuring torque transmission free of play when the shafts are displaced radially.

FIGS. 15 and 16 show an embodiment with studs 23 and 24 being provided with oblong holes 27 housing cylindrical bushings 28 capable of radial movement for receiving the fixing medium of coupling halves 1 and 2. This embodiment has the advantage with respect to the rectangular recesses of FIGS. 13 and 14 that the bushings 28 receiving the fixing elements of the coupling halves 1, 2 can roll off in the oblong holes 26, being thus subject to less wear and tear as would be the case with the formed parts 26 sliding in the rectangular recesses 25.

Reference is now made to FIGS. 17 and 18 where the attachment of the flanges of coupling halves 1 and 2 to studs 23 and 14 is illustrated, which studs are provided according to the embodiment of FIGS. 13 and 14 with rectangular recesses which are engaged by formed parts 26 for receiving the screw bolts 29. In this way radial mobility offset by 180° is obtained for both coupling halves 1 and 2.

Figure 20:
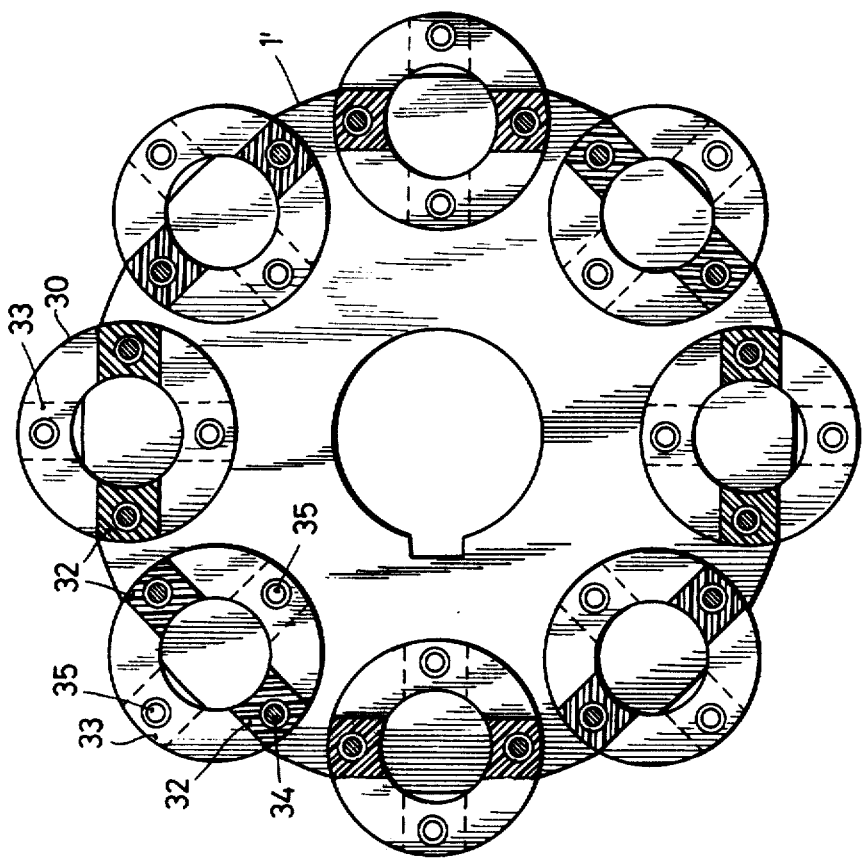
FIG. 19 is a partially sectional side view of a shaft coupling having a plurality of coupling members arranged at the periphery and FIG. 20 is a sectional view taken at XX—XX of FIG. 19.
Figure 19:
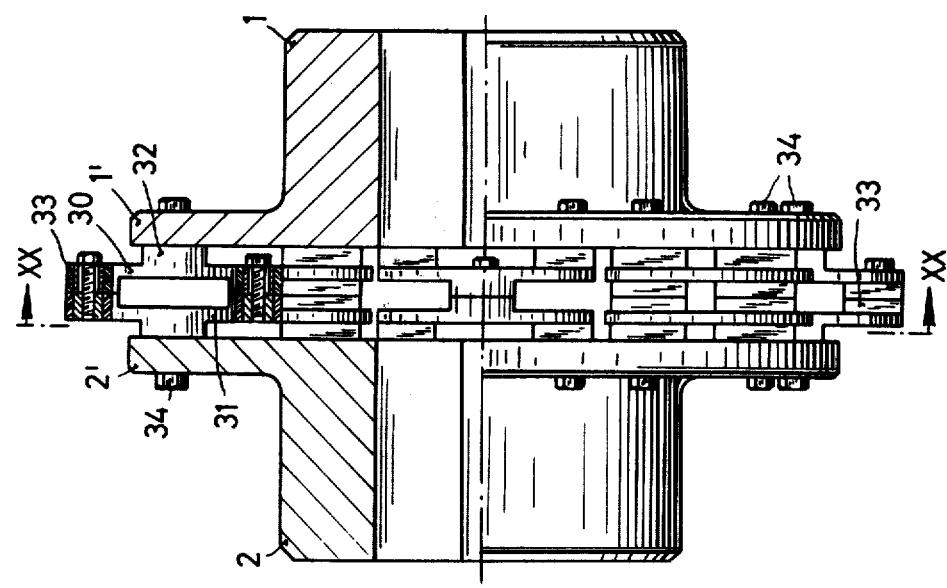

With couplings for transmitting greater turning moments it is possible, similarly, to provide a plurality of flexible coupling members on the periphery of the flanges of both coupling halves, as is being illustrated in FIGS. 19 and 20. Between flanges 1' and 2' — facing each other — of both coupling halves 1 and 2 there are e.g. eight flexible coupling members 30 spaced over the periphery of the flanges. Each coupling member 30 comprises, similar to the coupling member according to FIG. 11, respectively two annular disks 31 with, in each case, two diametrical studs 32 and 33. Mutually opposing studs 32 of each coupling member 30 are connected by means of screw bolts 34 to the associated coupling flanges 1' and 2', respectively, while studs 33 are joined together by means of screw bolts 35.

The turning moment which is to be transmitted e.g. from the coupling half 1 to the coupling half 2 spreads via screw bolts 34 onto studs 32 of the right hand (FIG. 19) annular disk 31 of the flexible coupling member 30 and from here via studs 33 and screw bolts 35 to the respective left hand (FIG. 19) disk 31 and via its studs 32 and bolts 34 to the left coupling flange 2'. The individual flexible coupling members 30 do, therefore, receive only the eighth part of the total load of the turning moment.

What we claim is:

1. Means for coupling a drive shaft to a driven shaft comprising a plurality of resilient, circular members and means forming said circular members one to the other and to said shafts, said means comprising each of said circular members being provided on each radially extending side thereof with a pair of radially, oppositely disposed projections extending parallel to the axis of said circular member, said pairs of projections being offset circumferentially one pair with respect to the other, and means for receiving a fastening means disposed within said projections whereby a plurality of said circular members can be mounted in spaced relationship by fastening means extending through aligned projections of said circular members.

2. The invention as defined in claim 1 and wherein the shafts are provided with interlocking claw-shaped lugs to provide driving engagement between the shafts upon failure of the circular members.

3. The invention as defined in claim 1 and in which said fastening means comprises conical bolts.

4. The invention as defined in claim 1 and in which said projections are provided with non-circular recesses to receive said fastening means.

5. The invention as defined in claim 1 and in which said projections are provided with oblong recesses to receive said fastening means.

* * * * *